United States Patent
Amiri et al.

(10) Patent No.: US 7,266,541 B2
(45) Date of Patent: *Sep. 4, 2007

(54) ADAPTIVE EDGE PROCESSING OF APPLICATION DATA

(75) Inventors: Khalil S. Amiri, Thornwood, NY (US); Ronald P. Doyle, Raleigh, NC (US); Yongcheng Li, Cary, NC (US); Thomas Francis McElroy, Morrisville, NC (US); Sanghyun Park, Nanuet, NY (US); Renu Tewari, San Jose, CA (US); Dinesh Chandra Verma, Mount Kisco, NY (US)

(73) Assignee: International Business Machines Corporation, Armonk, NY (US)

(*) Notice: Subject to any disclaimer, the term of this patent is extended or adjusted under 35 U.S.C. 154(b) by 396 days.

This patent is subject to a terminal disclaimer.

(21) Appl. No.: 10/121,272

(22) Filed: Apr. 12, 2002

(65) Prior Publication Data

US 2003/0195941 A1   Oct. 16, 2003

(51) Int. Cl.
   *G06F 17/30* (2006.01)
(52) U.S. Cl. .......................... 707/2; 707/200
(58) Field of Classification Search ................ 707/200, 707/202, 2, 101; 711/162, 122
   See application file for complete search history.

(56) References Cited

U.S. PATENT DOCUMENTS

| | | | | |
|---|---|---|---|---|
| 5,542,078 A | * | 7/1996 | Martel et al. | 707/101 |
| 5,812,996 A | * | 9/1998 | Rubin et al. | 707/2 |
| 6,012,052 A | * | 1/2000 | Altschuler et al. | 707/2 |
| 6,061,763 A | * | 5/2000 | Rubin et al. | 711/129 |
| 6,182,086 B1 | * | 1/2001 | Lomet et al. | 707/202 |
| 6,269,432 B1 | * | 7/2001 | Smith | 711/162 |
| 6,542,964 B1 | * | 4/2003 | Scharber | 711/122 |
| 6,643,667 B1 | * | 11/2003 | Arai et al. | 707/200 |
| 6,754,662 B1 | * | 6/2004 | Li | 707/101 |
| 2002/0010798 A1 | * | 1/2002 | Ben-Shaul et al. | 709/247 |

* cited by examiner

*Primary Examiner*—Zoila Cabrera
*Assistant Examiner*—Luke Osborne
(74) *Attorney, Agent, or Firm*—Jeanin Ray-Yarletts, Esq.; Steven M. Greenberg, Esq.; Carey Rodriguez Greenberg & Paul LLP

(57) ABSTRACT

An adaptive data replication and caching system configured for deployment at the network edge. This system can include a data caching system configured to cache application data in a data store and to satisfy queries for application data from the cache. The system also can include a data replication system configured to replicate application data in the data store and to satisfy queries for application data against the replicated application data. Finally, the adaptive data replication and caching system can include a configurator for configuring portions of the data store for exclusive use by the data caching system and the data replication system.

10 Claims, 4 Drawing Sheets

ADAPTIVE EDGE PROCESSING OF APPLICATION DATA

BACKGROUND OF THE INVENTION

1. Statement of the Technical Field

The present invention relates to the field of distributed computing and more particularly to edge processing of application data.

2. Description of the Related Art

As business organizations deploy important business applications over the Internet, challenges arise in the form of processing delays and network latencies. Specifically, the placement of application content in a centralized server can compel users' requests to traverse multiple congested networks in an attempt to effectively interact with the application. As a result, this centralized approach to deploying applications on the Internet can hinder the attainment of scalability, reliability and performance levels that are considered "mission-critical" in the deployment of a business application.

In consequence of the inherent deficiencies of the centralized approach, there has been a recent trend to move more application processing functions to the edge of the network. In lay terms, the "edge" of the network refers to that portion of a publicly accessible network which is disposed communicatively closer to the end-user. While the positioning of servers and other network devices at the edge of the network can bear direct relation to the geographical positioning of the end-users, in some cases, the positioning of servers at the edge of the network can bear closer relation to the available communications bandwidth and the performance of network components linking end-users to the servers.

E-Business applications can experience dramatic performance and scalability improvements by off-loading applications to the edge of the network. Application off-loading can be achieved by distributing both applications and associated data to the edge of the network. In consequence, the load experienced by the centralized application and data servers can be reduced as can associated network traffic. Ordinarily, application off-loading can be accomplished by decomposing an application into edgable and non-edgable components, where the edgable components are those components which can be distributed to the edge of the network, while the non-edgable components are those components which cannot be distributed to the edge.

Notably, some components can be classified as non-edgable because of their dependence upon a back-end data store. Thus, by removing the back-end data store to the edge of the network, those previously non-edgable components which rely upon the back-end data store, too can be removed to the edge of the network. Two common methods of off-loading data to the edge of the network include data replication and query caching.

Data replication does not decompose an application into edgable and non-edgable components. Rather, data replication distributes an entire application to the edge of the network, along with that portion of the data store required for the operation of the application. The replicated portion of the data store can satisfy the majority of the data requirements for the edgified application. In those few cases where the data store cannot support the operation of the application, a query can be posed to the back-end data store.

Query caching, by comparison, involves the dynamic storage of query results based upon query rules which determine when the results of a query ought to be stored in a local data store at the edge of the network. Specifically, instead of replicating an entire data unit to the edge of the network, query caching involves only the caching of data in the local data store after the data has been retrieved from the back-end data store. The cached data can be used to satisfy subsequent queries without retrieving the requested data from the back-end data store. Of course, where the requested data cannot be satisfied by the cache, the back-end data store can satisfy the query.

Both data replication and query caching have associated therewith strengths and weaknesses. Data replication can satisfy any read query, but data replication can require substantial data storage to accommodate an entire database, including specific tables and views. Additionally, data replication requires extensive manual configuration inasmuch as a database administrator must identify the set of database tables which should be removed to the edge of the network. As the correct set of database tables can change over time, it can become difficult for the administrator to accurately maintain an appropriate data set at the edge of the network.

Query caching, by comparison, can be said to be "auto-configuring" and does not require as much administrative intervention. Also, query caching can require a limited amount of local storage to support the query cache. Yet, unlike data replication, query caching can involve some extensive processing, including not only determining when to store the results of a query in the query cache, but also when to retrieve data from the query cache rather than forwarding a query to the back-end data store. Specifically, in addition to parsing a query to identify the target database table and the requested operation, for instance a requested read or update operation, query caching can require a caching component to determine whether the query can be satisfied against the data set presently residing in the local data store.

SUMMARY OF THE INVENTION

The present invention is an adaptive data replication and caching system configured for deployment at the network edge which overcomes the deficiencies of the prior art. An adaptive data replication and caching system configured for deployment at the network edge can include a data caching system configured to cache application data in a data store and to satisfy queries for application data from the cache. The system also can include a data replication system configured to replicate application data in the data store and to satisfy queries for application data against the replicated application data. Finally, the adaptive data replication and caching system can include a configurator for configuring portions of the data store for exclusive use by the data caching system and the data replication system.

In one aspect of the invention, the system can include a set of operator hints for use by the configurator when configuring the portions of the data store. Also, the system can further include at least one log file to which the data caching system and the data replication system can write entries. Each one of the entries can include one of the requested queries and an indication whether the one of the requested queries had been satisfied by one of the data caching system and the data replication system. Notably, the configurator can base the configuration of the data store upon access patterns indicated by the entries in the log file.

The system can include a database proxy. In particular, the database proxy can receive the queries for application data and can forward the received queries for application data to at least one of the data replication system and the data caching system. Alternatively, the system can include a database client library. Like the database proxy, the database client library can receive the queries for application data and can forward the received queries for application data to at least one of the data replication system and the data caching system.

A method of adaptively configuring a local data store at the edge of a network can include identifying all combinations of network application database tables whose combined size can fit within space limitations of the local data store. The method also can include further identifying historically which combinations would have been able to best satisfy queries for application data. In consequence, enough space in the local data store can be allocated to accommodate the combinations which are able to best satisfy the queries for application data and which further can fit within the space limitations of the local data store. Finally, at least a portion of the remaining space in the local data store can be further allocated for a data cache. In that regard, in one aspect of the invention, the remaining space in the local data store can be further allocated for the data cache.

A method for processing a database query at the edge of a network can include processing the database query in a database replication system. The database replication system can determine whether the database query can be satisfied by replicated data stored in an allocated portion of a local data store. As a result, the database replication system can satisfy the database query if it is determined that the database query can be satisfied by the replicated data. Otherwise, the method can include further processing the database query in a database caching system.

The database caching system can determine whether the database query can be satisfied by cached data stored in a second allocated portion of the local data store. In that regard, the database caching system can satisfy the database query if it is determined that the database query can be satisfied by the cached data. Otherwise, the database query can be forwarded to a back-end database system where it is determined that the database query can be satisfied neither by the database replication system nor by the database query system.

BRIEF DESCRIPTION OF THE DRAWINGS

There are shown in the drawings embodiments which are presently preferred, it being understood, however, that the invention is not limited to the precise arrangements and instrumentalities shown, wherein.

DETAILED DESCRIPTION OF THE PREFERRED EMBODIMENTS

The present invention is an adaptive database caching and replication system. The adaptive database caching and replication system can configure local cache storage at the edge of the network to accommodate the operation both of a database replication system and of a database query caching system. For example, the configuration of the local cache storage can vary based upon the size of the local cache storage, access patterns to the local cache storage and operator hints. In this way, the advantages both of data replication and of query caching can be achieved without succumbing to the well-known inherent deficiencies of each individual caching and replication methodology.

Figure 1:
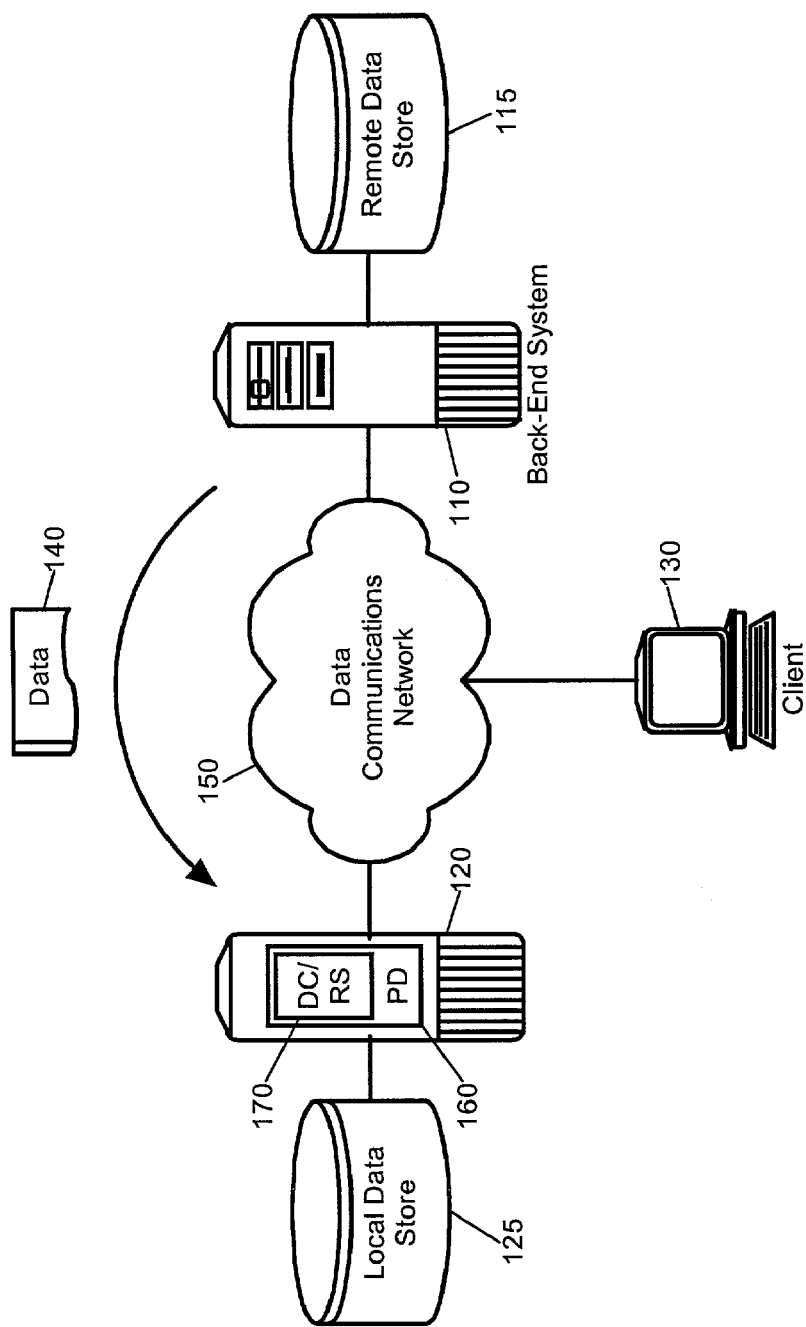
FIG. 1 is a schematic illustration of a database-driven network application system in which an edge-deployed adaptive database caching and replication system can be deployed.

FIG. 1 is a schematic illustration of a database-driven network application system in which an edge-deployed adaptive database caching and replication system can be deployed. As shown in FIG. 1, the database-driven network application system can include a remotely positioned back-end database system 110 having a communicatively linked data store 115. The database-driven network application system further can include a local database system 120 having also having a communicatively linked data store 125.

The local database system 120 can be deployed at the edge of the data communications network 150. In this way, client 130 requests to access the back-end database system 110 first can be received in the edge-deployed local database system 120 and potentially processed in the local database system 120 without requiring further processing in the remotely positioned back-end database system 110. Specifically, for each client 130 request to access the remote database system 110, the local data store 125 first can be inspected to determine if the client 130 request can be satisfied by the contents of the local data store 125.

Notably, only where the edge-deployed local database system 120 cannot process a client 130 request will the local database system 120 forward the request to the back-end database system 110. Subsequently, the back-end database system 110 can provide the requested data 140 to the edge-deployed local database system 120, which in turn can satisfy the client 130 request with such data 140. In this way, unnecessary network traffic can be avoided and the client 130 can receive a response to the request much more quickly than would otherwise be possible if every client 140 request were handled by the back-end database system 110.

In operation, client 130 requests for data can be received in the local database system 120 through a proxy driver 160, or other such database system middleware, for example a database client library, though the invention is not so limited to the particular type of database system middleware. In accordance with the inventive arrangements, the proxy driver 160 can include an adaptive database caching and replication system 170. Unlike conventional database caching systems or data replication systems, in the adaptive database caching and replication system 170 of the present invention, both methodologies can be applied using a common local data store 125 in order to capitalize on the advantages of each while avoiding the deficiencies associated with the exclusive operation of only one.

Figure 2:
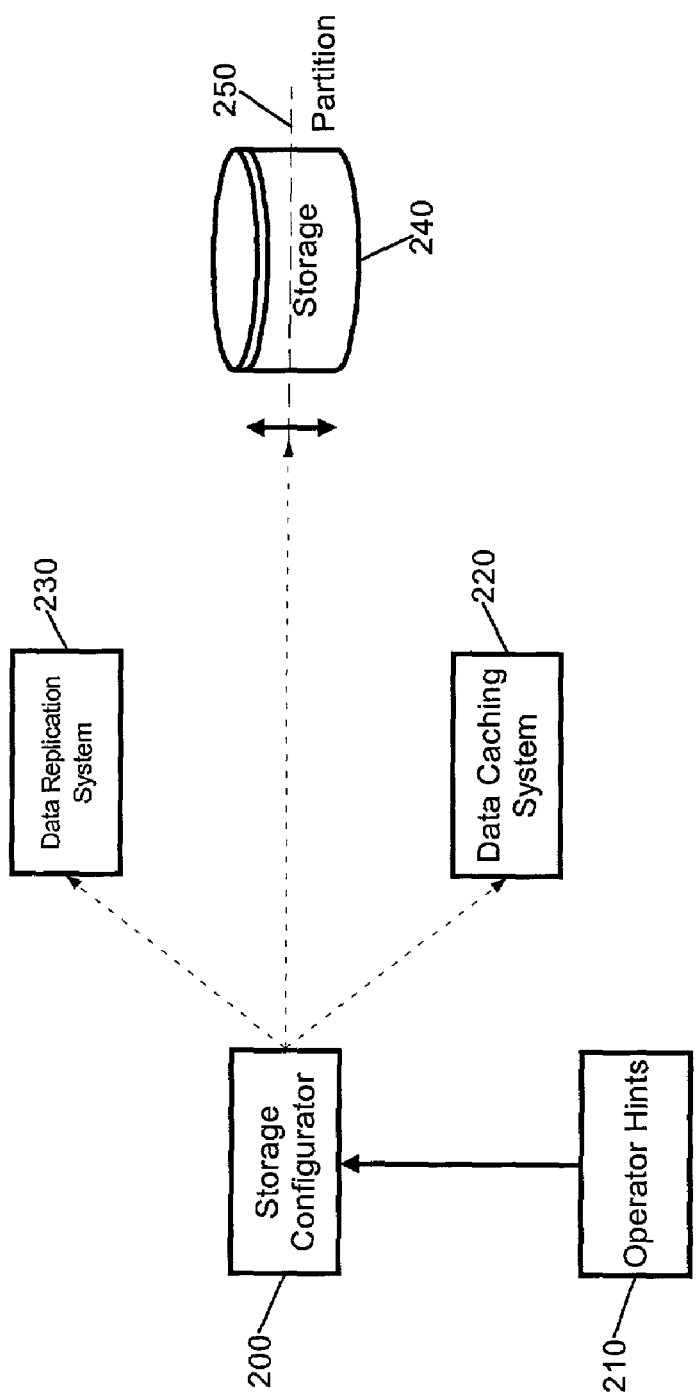
FIG. 2 is a block diagram illustrating the adaptive configuration of the data caching and replication system of FIG. 1.

FIG. 2 is a block diagram illustrating the adaptive configuration of the data caching and replication system 170 of FIG. 1. The adaptive configuration of the data caching and replication system combines both push-based caching of the content replication methodology with the demand driven caching of a query caching system. Specifically, the adaptive configuration of the data caching and replication system can include a local data store 240, a data caching system 220, a data replication system 230, a storage configurator 200 and a set of operator hints 210.

In order to limit storage at the edge of the network, a pre-configured amount of local storage in the local data store 240 can be divided between the data replication system 230 and the data caching system 220. This division can be represented in the illustration of FIG. 2 according to the partition 250. The amount of storage allocated by the partition 250 between the data replication system 230 and the data caching system 220 can shift dynamically depending upon the access patterns of different database tables in the database driven network application.

Still, the invention is not limited merely to the division of a pre-configured storage area between a data replication system and data caching system. Rather, in other aspects of the invention, each of the data replication system and data caching system can have associated storage spaces configured without regard to the size of the storage spaces of one another. Yet, it is to be understood that in many cases, only a pre-configured amount of storage space will be available for use by the data replication system and the data caching system of the present invention. This, in those cases, the limited amount of storage space can be partitioned between the two.

In one aspect of the present invention wherein only a limited amount of storage space is partitioned between the data replication system 230 and the data caching system 220, initially, all of the local data store 240 can be devoted for use by the data caching system 220. Periodically, access patterns can be analyzed and the partition 250 can be adjusted to provide for an appropriate amount of storage for each of the data replication system 230 and the data caching system 220 depending upon the results of the analysis. Importantly, the access pattern analysis can be performed at regular intervals, or on-demand as the case may be. Operator hints 210 further can assist in the allocation of storage in the local data store 240.

For example, the operator hints 210 can specify the synchronization requirements of data tables which can be used to identify the set of data units which can be either replicated or cached. In that regard, the operator hints 210 can provide such information as a specific data table with the database which typically will not be updated for a day. Examples include a table of customer addresses, for instance. Such information further can indicate which type of data can be cached or replicated, and which type of data can neither be cached nor replicated. Notably, the operator hints 210 can indicate which types of tables are accessed more frequently and which should be preferred for caching. Finally, the operator hints 210 can provide a bounding or limit of the amount of storage in the local data store 240 which ought to be allocated by the storage configurator 200.

The data replication system 230 can provide a mechanism for performing queries against a set of cached database tables in the local data store 240. The data caching system 220, by comparison, can perform queries from the back-end database system and can cache the resulting objects in the local data store 240. In either case, when a subsequent data query can be satisfied from among the cached objects in the local data store 240, the data caching system 220 can execute the requested data query against the set of cached objects in the local data store 240 rather than forwarding the data query to the back-end database system.

Significantly, the storage configurator 200 can determine the amount of storage in the local data store 240 which ought to be allocated between the data caching system 220 and the data replication system 230. The storage configurator 200 also can determine which tables ought to be replicated and what types of queries ought to be cached preferentially by the data caching system 220. In a preferred aspect of the present invention, the storage configurator 200 can execute periodically to recompute the partition 250.

To configure the position of the partition 250 which can define the amount of storage in the local data store 240 for use by the data replication system 230, first the configurator 200 can obtain the size of the tables which are present in the remotely positioned back-end database system. The configurator 200 further can compute the maximum number of tables which can be cached in the local data store 240. Notably, the operator hints 210 can be consulted to ensure that the synchronization requirements of each table is not so stringent as to prevent the caching of the table in the local data store 240.

The set of tables can be arranged in order of increasing storage requirements. The configurator 200 subsequently can compute all possible combinations of the tables in the set, whose storage requirements of each combination fall within the maximum amount of storage available in the local data store 240. Subsequently, during the operation of the data replication system 230, access statistics for the tables of each combination can be reviewed. In particular, for each combination whose storage requirements fall within the maximum amount of storage available in the local data store 240, it can be determined what fraction of queries historically could have been satisfied by the tables in the combination.

In consequence, those combinations which historically most likely could satisfy the most queries can be replicated in the local data store 240. Thus, the configurator 200 can allocate only as much storage space in the local data store 240 as will be required to replicate the selected combinations. The remaining portion of the local data store 240 can be allocated for use by the data caching system 220. In that regard, in order to improve the effectiveness of the data caching system 220, the configurator 200 can determine a set of query templates that are likely to be repeated through queries to the back-end database system. The determined set of query templates can be cached preferentially over those queries which do not fit a template.

The determination of the query templates for query caching can be performed by analyzing those queries which had been historically processed by the data caching system 220. For each historically process query, a set of templates can be generated which match the specific query. For instance, the historically received query, "SEARCH (table=people) AND (name=Li) AND (location=Raleigh)" can correspond to the three templates, "(table=people)", "(name=Li)" and "(location=Raleigh)". Subsequently, the configurator 200 can determine the types of templates in the set which have the highest access probabilities associated therewith. The top query templates can be selected for caching.

Figure 3:
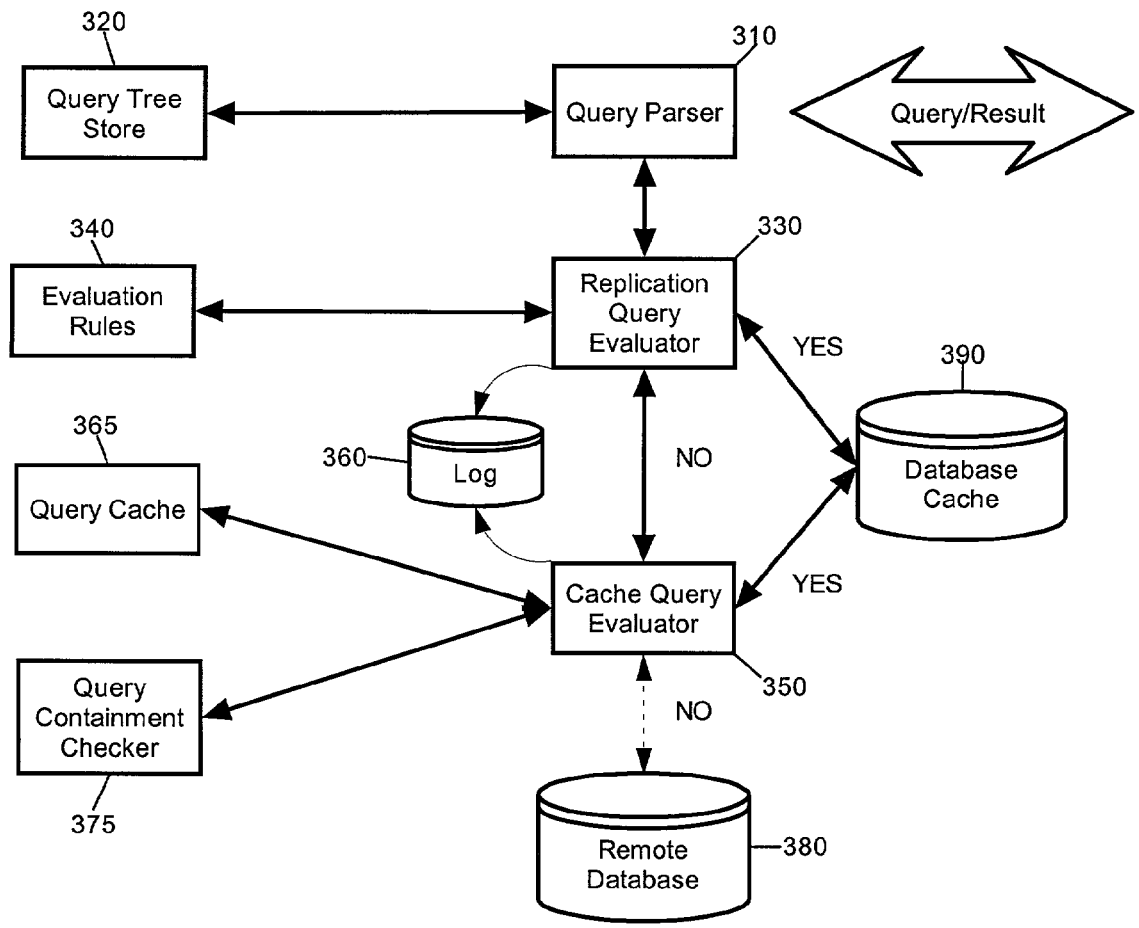
FIG. 3 is block diagram illustrating the configuration and operation of the adaptive replication and data caching system of FIG. 2; and, FIG. 4 is a block diagram illustrating a summary process for adaptively configuring and operating the replication and data caching system of FIGS. 2 and 3.

FIG. 3 is block diagram illustrating the configuration and operation of the adaptive replication and data caching system of FIG. 2 in accordance with a preferred, albeit not exclusive aspect of the present invention. As shown in FIG. 3, queries can be received by the query parser 310. The query parser 310 can parse each received query into its constituent portions in a query tree store 320 as is known in the art. Initially, a data replication system query evaluator 330 can process individual portions of the received query in the query tree store 320 to determine whether, according to associated evaluation rules 340 the query portion can be resolved by tables already stored in the local data store 390. If so, the data replication system query evaluator 330 can locally process the evaluated portion using the tables replicated in the local data store 390 and a result can be returned to the requestor.

In contrast, if the data replication system query evaluator 330 cannot process the evaluated portion of the query with the tables already stored in the local data store 390, the database caching system query evaluator 350 can consult the query cache 365 to determine whether the evaluated portion of the received query matches a stored query template, indicating whether the cache in the local data store 390 can satisfy that portion of the received query. If so, the database caching system query evaluator 350 can return the cached result to the individual portion of the received query without forwarding the query onto the back-end database system 380.

However, if the database caching system query evaluator 350 cannot satisfy the evaluated portion of the query locally, then the evaluated portion of the query can be forwarded to the back-end database system 380 and the result can be forwarded to the requester. Importantly, as each of the data replication system query evaluator 330 and the database caching system query evaluator process the evaluated portion of the received query, the evaluated portion and the result of each evaluation can be written to a log 360. Using the log 360, the configurator 200 of FIG. 2 can process historically requested queries to adaptively configure the local data store 390.

For example, at periodic intervals, or on-demand as the case may be, the configurator 200 can examine the log 360 to obtain access statistics for the combination of tables which can be stored in the local data store 390. Two metrics can be tracked for each combination of tables: the fraction of queries which can be satisfied by the combination, and the storage requirement for the associated combination as a fraction of the size of the local data store 390. A "goodness metric" can be defined as the ratio of the fraction of queries which can be satisfied by the combination to the storage requirement for the associated combination. Those combinations having the largest goodness metric can be selected for replication in the local data store 390.

Thus, the present invention can automatically identify a "hot" data unit set which can be efficiently replicated to the edge of the network in order to improve network and application performance within the constraint of storage space limitations at the edge of the network. Concurrently, the present invention can maintain a robust data caching system able to serve those queries to data units which cannot be replicated to the edge of the network. Hence, the present invention can provide an optimal combination of storage and processor utilization for application off-loading at the edge of the network.

Figure 4:
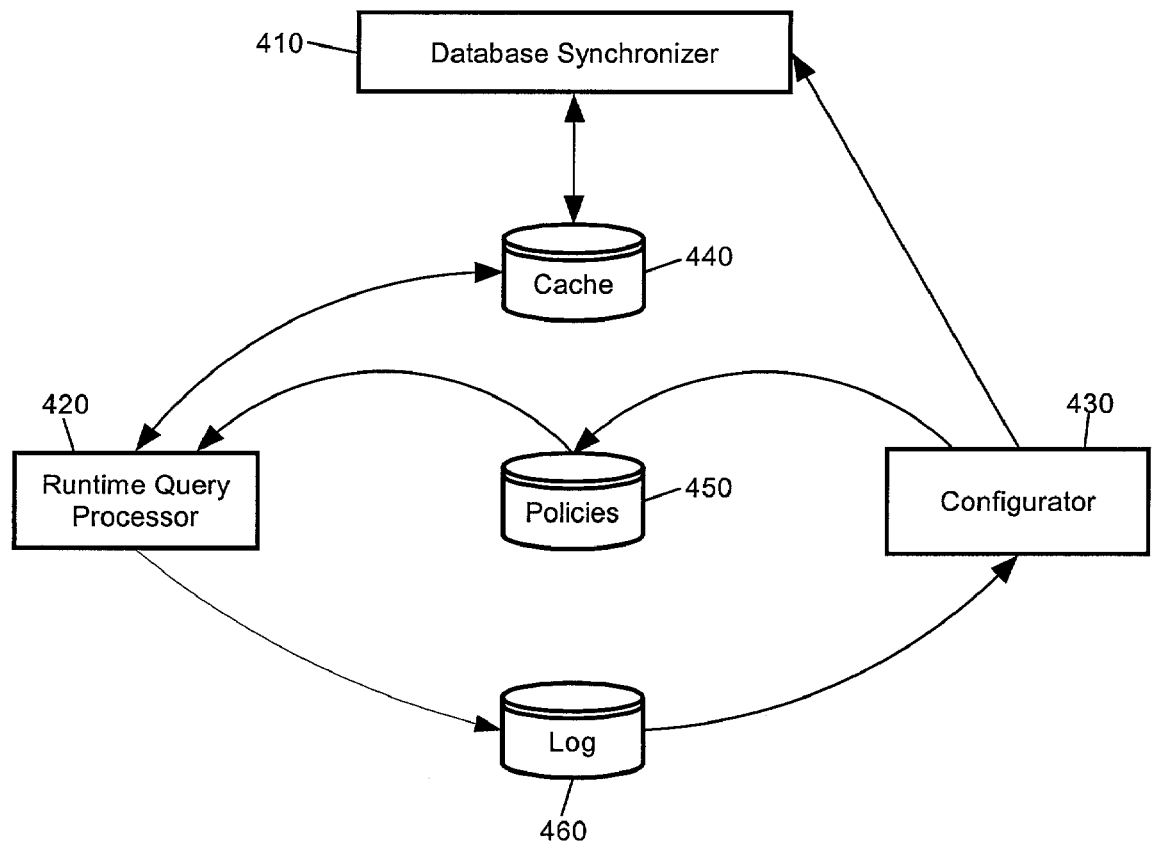

FIG. 4 is a block diagram illustrating a summary system for adaptively configuring and operating the replication and data caching system of FIGS. 2 and 3. As will be apparent from the illustration, three main components can be included in the system: the database including the synchronization component 410 and the database cache 440, the run-time query processor 420, and the configurator 430. The runtime query processor can be viewed as the "work horse" component as the runtime query processor receives incoming requests, processes the incoming requests and applies the incoming requests where possible against the database cache 440 and the query cache (not shown). Importantly, the runtime query processor 420 can write a record of each attempt and the results to the access statistics log 460.

The configurator 430 can analyze the contents of the access statistics log 460. Based upon the analysis, the configurator 430 can determine how best to maximize the number of cache "hits" per unit of cache storage. In consequence, the configurator 430 can modify the configuration policies 450 which controls the configuration of the available storage. Importantly, updates to the database cache 440 performed by the database synchronizer 410 can occur in consequence of the changed configuration policies 450. Furthermore, during runtime the runtime query processor can perform updates to the database cache 440 based upon the modified configuration policies 450.

Importantly, the present invention can relieve the application administrator from manually identifying the set of data units which must be replicated to the edge of the network where knowledge is limited. Furthermore, the present invention can adapt the concurrent utilization of the data replication system and the data caching system according to the changing pattern of user interests by re-assessing the data set residing at the edge of the network. Thus, application performance can be automatically and adaptively optimized.

The present invention can be realized in hardware, software, or a combination of hardware and software. An implementation of the method and system of the present invention can be realized in a centralized fashion in one computer system, or in a distributed fashion where different elements are spread across several interconnected computer systems. Any kind of computer system, or other apparatus adapted for carrying out the methods described herein, is suited to perform the functions described herein.

A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which, when loaded in a computer system is able to carry out these methods.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

We claim:

1. A method of adaptively configuring a local data store at the edge of a network, said method comprising the steps of:
    identifying all combinations of network application database tables whose combined size can fit within space limitations of the local data store, each said database table comprising a set of data, and further identifying historically which combinations would have been able to satisfy queries for application data using a predetermined criteria;
    allocating enough space in said local data store to accommodate said combinations which are able to satisfy said queries for application data using said predetermined criteria and which further can fit within said space limitations of the local data store; and,
    further allocating at least a portion of said remaining space in said local data store for a data cache.

2. The method of claim 1, wherein said further allocating step comprises further allocating said remaining space in said local data store for said data cache.

3. The method of claim 1, wherein said step of identifying all combinations of network application database tables whose combined size can fit within space limitations of the local data store, comprises the steps of:
considering operator hints which indicate whether a particular database table can be replicated; and,
disregarding any of said particular database tables whose synchronization requirements prohibit replication to the edge of the network.

4. A method for processing a database query at the edge of a network, said method comprising the steps of:
processing said database query in a database replication system, said database replication system determining whether said database query can be satisfied by replicated data stored in a first allocated portion of a local data store, said database replication system satisfying said database query if it is determined that said database query can be satisfied by said replicated data;
further processing said database query in a database caching system if it is determined that said database query cannot be satisfied by replicated data stored in an allocated portion of a local data store, said database caching system determining whether said database query can be satisfied by cached data stored in a second allocated portion, separate from said first allocated portion, of said local data store, said database caching system satisfying said database query if it is determined that said database query can be satisfied by said cached data; and,
forwarding said database query to a back-end database system where it is determined that said database query can be satisfied neither by said database replication system nor by said database query system.

5. The method of claim 4, further comprising the steps of:
maintaining at least one log of said database queries and said determinations;
accessing said at least one log to adaptively re-partition said local data store into a first partition for use by said database replication system, and a second partition for use by said database caching system;
replicating selected data to said first partition according to said at least one log; and,
caching selected data to said second partition according to said at least one log.

6. A machine readable storage having stored thereon a computer program for adaptively configuring a local data store at the edge of a network, said computer program comprising a routine set of instructions for causing the machine to perform the steps of:
identifying all combinations of network application database tables whose combined size can fit within space limitations of the local data store, each said database table comprising a set of data, and further identifying historically which combinations would have been able to satisfy queries for application data using a predetermined criteria;
allocating enough space in said local data store to accommodate said combinations which are able to satisfy said queries for application data using said predetermined criteria and which further can fit within said space limitations of the local data store; and,
further allocating at least a portion of said remaining space in said local data store for a data cache.

7. The machine readable storage of claim 6, wherein said further allocating step comprises further allocating said remaining space in said local data store for said data cache.

8. The machine readable storage of claim 6, wherein said step of identifying all combinations of network application database tables whose combined size can fit within space limitations of the local data store, comprises the steps of:
considering operator hints which indicate whether a particular database table can be replicated; and,
disregarding any of said particular database tables whose synchronization requirements prohibit replication to the edge of the network.

9. A machine readable storage having stored thereon a computer program for processing a database query at the edge of a network, said computer program comprising a routine set of instructions for causing the machine to perform the steps of:
processing said database query in a database replication system, said database replication system determining whether said database query can be satisfied by replicated data stored in a first allocated portion of a local data store, said database replication system satisfying said database query if it is determined that said database query can be satisfied by said replicated data;
further processing said database query in a database caching system if it is determined that said database query cannot be satisfied by replicated data stored in an allocated portion of a local data store, said database caching system determining whether said database query can be satisfied by cached data stored in a second allocated portion, separate from said first allocated portion, of said local data store, said database caching system satisfying said database query if it is determined that said database query can be satisfied by said cached data; and,
forwarding said database query to a back-end database system where it is determined that said database query can be satisfied neither by said database replication system nor by said database query system.

10. The machine readable storage of claim 9, further comprising the steps of:
maintaining at least one log of said database queries and said determinations;
accessing said at least one log to adaptively re-partition said local data store into a first partition for use by said database replication system, and a second partition for use by said database caching system;
replicating selected data to said first partition according to said at least one log; and,
caching selected data to said second partition according to said at least one log.

* * * * *